United States Patent [19]
Unterberg

[11] Patent Number: 6,065,292
[45] Date of Patent: May 23, 2000

[54] MASTER CYLINDER

[75] Inventor: Hartmut Unterberg, Koblenz, Germany

[73] Assignee: Lucas Industries plc, United Kingdom

[21] Appl. No.: 09/157,024

[22] Filed: Sep. 18, 1998

Related U.S. Application Data

[63] Continuation of application No. PCT/EP97/01306, Mar. 14, 1997.

[51] Int. Cl.[7] .................................. F15B 7/00; F16J 15/18
[52] U.S. Cl. .................................. 60/589; 60/533; 92/168
[58] Field of Search .............................. 60/533, 568, 569, 60/589, 591; 92/165 R, 166, 168

[56] References Cited

U.S. PATENT DOCUMENTS

| | | | |
|---|---|---|---|
| 2,405,093 | 7/1946 | Brie | 92/168 X |
| 2,880,584 | 4/1959 | French | 60/589 |
| 3,044,268 | 7/1962 | Harrison | 60/589 |
| 3,074,235 | 1/1963 | Hager | 60/589 X |
| 3,232,059 | 2/1966 | Thesier | 60/589 |
| 3,266,383 | 8/1966 | Cairns | 60/533 X |
| 3,490,232 | 1/1970 | Baldwin | 92/168 |
| 4,128,249 | 12/1978 | Manzini | 92/165 R |
| 4,531,452 | 7/1985 | Spielmann et al. | 92/168 |
| 4,532,856 | 8/1985 | Taylor | 92/168 |
| 4,627,332 | 12/1986 | Furuta et al. | 92/168 |
| 4,781,024 | 11/1988 | Nakamura | 60/533 |
| 5,074,197 | 12/1991 | Mori et al. | 92/165 R |
| 5,095,702 | 3/1992 | Volz | 92/165 R X |
| 5,127,497 | 7/1992 | Struckmeyer et al. | 92/165 R X |
| 5,161,376 | 11/1992 | Hartmann . | |
| 5,187,934 | 2/1993 | MOri | 92/165 R X |
| 5,428,960 | 7/1995 | Hanaoka | 60/533 |
| 5,449,225 | 9/1995 | Burgdorf et al. . | |

FOREIGN PATENT DOCUMENTS

| | | |
|---|---|---|
| 0519533 | 5/1995 | European Pat. Off. . |
| 42 02 217 A1 | 7/1993 | Germany ................... 60/533 |
| 4202217 | 7/1993 | Germany . |
| 2148434 | 5/1985 | United Kingdom . |

*Primary Examiner*—John E. Ryznic
*Attorney, Agent, or Firm*—MacMillan, Sobanski & Todd, LLC

[57] ABSTRACT

A master cylinder (10) for a hydraulic vehicle braking system comprises a housing (12) which has a bore (14) extending along a longitudinal axis (A), whose one end is closed by an end wall associated with the housing (12) of the master cylinder (10) and whose other opposite end is sealingly closed by a closure element (16). In the bore (14) adjacent to the closure element (16) a piston (18) is accommodated sealingly and axially movable which can be actuated through same, which has a central valve (20) which enables a fluid connection between a fluid reservoir and a pressure chamber (28) which is defined in the bore (14) by the end wall and the piston (18). When the piston (18) is not actuated, the central valve (20) is held in the open position by means of an abutment member (transverse pin 34) acting on the closure element (16). In order to ensure a defined opening point with respect to the piston (18) even then when the central valve (20) is to open against an overpressure, the closure element (16) consists of an annular elastomeric part (42) which faces towards the pressure chamber (28) and of a detachably connected and axially succeeding part (44) made form rigid material which is also designed annularly. For the generation of a quasi-rigid stop the part (44) made from rigid material comprises an annular circumferential projection (46), which is integrally formed with same whose maximum cross-sectional dimension amounts to not more than approximately half of the cross-sectional dimension of the elastomeric part (42), and which penetrates the elastomeric part (42) completely or nearly completely in an axial direction.

6 Claims, 1 Drawing Sheet

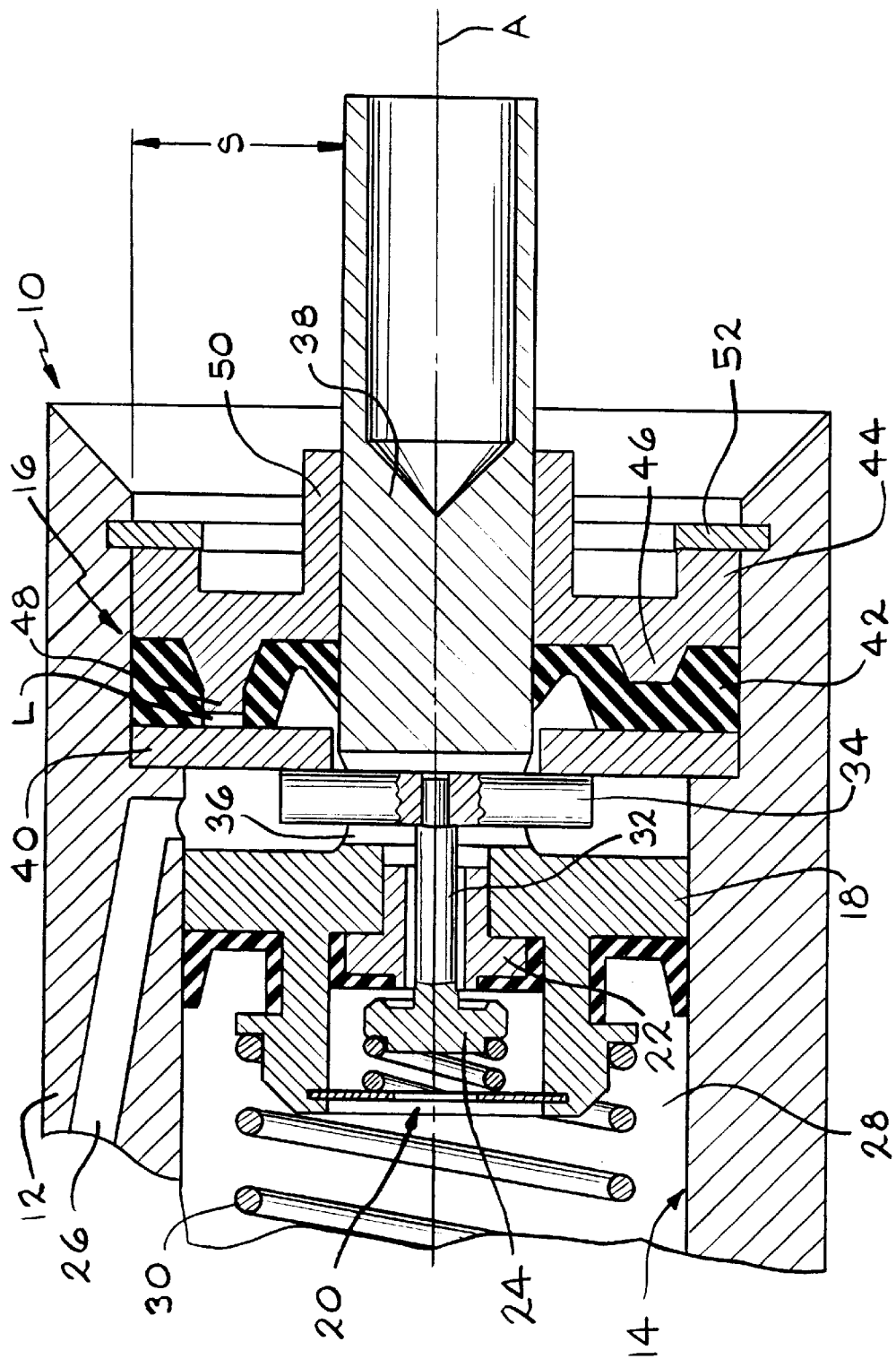

MASTER CYLINDER

This application is a continuation of copending application International Application No. PCT/EP97/01306 filed on Mar. 14, 1997, and which designated the U.S.

The invention relates to a master cylinder, often also referred to as master brake cylinder, for a hydraulic vehicle braking system with a housing which has a bore extending along a longitudinal axis, whose one end is closed by an end wall associated with the housing of the master cylinder and whose other opposite end is sealingly closed by a closure element, with a piston being accommodated sealingly and axially movable in the bore adjacent to the closure element, which can be actuated through same, which has a central valve which enables a fluid connection between a fluid reservoir and a pressure chamber which is defined in the bore by the end wall and the piston and which, when the piston is not actuated, is held in the open position by means of an abutment member acting on the closure element, and with the closure element being formed from two separate annular parts axially succeeding one another, with the first part facing towards the bore being made from an elastomeric material and the second part facing away from the bore being made from a rigid material. Such a master cylinder is known from EP 0 467 021 A1.

Master cylinders of this type are used in vehicles primarily together with brake pressure regulation systems, with these brake pressure regulation systems nowadays often fulfilling both the function to prevent locking of the vehicle wheels during braking (so-called antilock system) and the function to prevent slipping of the driving wheels during acceleration in particular on slippery ground (so-called antislip control). As already mentioned the central valve arranged in the piston is held open in the not actuated condition of the master cylinder, i.e. with the piston in its rest or initial position, by an abutment member connected with the central valve, which directly or indirectly bears against the end face of the part made of elastomeric material associated with the closure element facing towards same.

Opening of the central valve is effected in that the abutment member connected with same comes into abutment with the end face of the closure element facing towards the abutment member and bears against same during the return motion of the piston into its initial position after an actuation of the master cylinder, which results in the opening of the central valve. This means that the central valve must be opened against the pressure which prevails in the pressure chamber at this moment. Under normal running conditions it is often the case that at that moment at which the abutment member abuts the closure element, no overpressure or only a slight overpressure exists in the pressure chamber. Under certain conditions it may, however, become necessary that the central valve must be opened against a considerable overpressure, in particular when immediately after an antislip control cycle a braking operation is necessary and the master cylinder is therefore actuated. In such a case, the fluid pressure that has been built up in the pressure chamber of the master cylinder within the antislip control is no longer able to be relieved prior to the immediately following brake actuation because the additional fluid volume that has been supplied to the pressure chamber for the pressure build-up during the antislip control cycle cannot be returned to the fluid reservoir due to the immediately following brake actuation. Depending on the fluid pressure which still prevails in the pressure chamber the opening time of the central valve varies, however, because the abutment member which is connected with the central valve penetrates the elastomeric part of the closure element all the deeper, the higher the still prevailing pressure in the pressure chamber, and the central valve can open only at a corresponding counterforce which is applied by the closure element to the abutment member. A clear definition of the opening time of the central valve with respect to the piston arranged in the bore of the master cylinder is therefore not possible; the central valve opens earlier in one case or later in another, depending on certain operating conditions. This is undesirable for reasons of a brake response behaviour which should be as uniform as possible.

The invention is based on the object to further develop a master cylinder of the initially described type in such a manner that a brake response behaviour which is as uniform as possible, in particular an opening behaviour of the central valve, which is defined at all times, is ensured regardless of the operating conditions.

This object is solved according to the invention in that the two parts of the closure element are detachably connected with each other and in that an annular circumferential projection, which is integrally formed with the part made from rigid material and whose maximum cross-sectional dimension amounts to not more than approximately half of the cross-sectional dimension of the part made from elastomeric material, penetrates the latter completely or nearly completely in an axial direction. The term "nearly completely" in this connection means that the annular circumferential projection which is formed on the part made from rigid material has its axial free end not exactly in the end face of the elastomeric part, which faces towards the abutment member, but slightly below it, i.e. that the axial free end of the projection is at a slightly greater distance in the axial direction from the abutment member connected with the central valve than the end face of the elastomeric part. The slight projection of the elastomeric part with respect to the part made from rigid material ensures that the abutment member will always abut the closure part in a soft and slightly dampened manner, but subsequently immediately contacts the free end of the projection formed at the part made from rigid material so that regardless of the pressure against which the central valve must be opened, a defined opening of the central valve is ensured. The described configuration of the inventive closure element thus presents a rigid or quasi-rigid stop for the abutment member connected with the central valve or an abutment disk which is arranged between said abutment member and the closure element, without detrimentally affecting the sealing function of the closure element. Due to the fact that the maximum cross-sectional dimension of the circumferential projection amounts to no more than approximately half the cross-sectional dimension of the elastomeric part, sufficient elastomeric material remains radially inward and radially outward of the projection to ensure a good, also radially resilient, sealing effect.

The annular circumferential projection of the part made from rigid material may have the form, for example, of a closed annulus. The radially outward and the radially inward section of the elastomeric part are then connected with each other by several bridge-shaped connecting pieces which straddle the projection. The annular circumferential projection may alternatively be formed by several annular segments between which space for connecting webs between the radially inward and the radially outward section of the elastomeric part has been left. According to another modification at least the free end of the annular circumferential projection may be formed by a number of pin-shaped extensions which are equally spaced from one another in the circumferential direction and which extend in an axial direction. The rigid or quasi-rigid stop of such an embodiment is formed by an annular arrangement of approximately dot-shaped abutment surfaces.

Regardless of the configuration of the annular circumferential projection the cross-sectional dimension of the projection preferably decreases towards its free end. The reduction of the cross-sectional dimension of the projection may be effected continuously or in a step-wise manner. The reduction of the cross-sectional dimension provides for a still better sealing effect because increasingly more elastomeric material is present towards the free end of the projection radially inward and radially outward of same which results in a better radial compensating capability of the closure element in the area of its elastomeric part.

The part of the closure element made of rigid material preferably has a hollow cylindrical extension at its end face facing away from the part made of elastomeric material. This extension serves to improve the guidance of an actuating element which acts on the piston arranged in the bore of the master cylinder.

In order to ensure a good sealing effect of the closure element also at a higher pressure, its part made from rigid material should, in particular, not have passages in the area of the surface with which it abuts the part of elastomeric material. Otherwise, areas of the elastomeric part could force themselves into such passages under a corresponding pressure load so that there would be a shortage of elastomeric material at other sealing positions.

An embodiment of an inventive master cylinder will be described in more detail in the following with reference to the accompanying figure which is an enlarged cross-sectional view of the end section of an inventive master cylinder which is of interest here.

BRIEF DESCRIPTION OF THE FIGURE

FIG. 1 shows the central valve for the master cylinder.

The only FIGURE shows the power input end of a master cylinder which is generally identified by 10 for a hydraulic vehicle braking system. The master cylinder 10 has an elongated housing 12 with a bore 14 which extends along a longitudinal axis A and which is designed as a stepped bore in the illustrated embodiment. The one end not shown here of said bore 14 is usually tightly closed by an end wall associated with the housing 12 of the master cylinder 10. The other end of the bore 14 opposite said end is sealingly closed as illustrated by means of a closure element 16 whose construction will be explained later in more detail.

The bore 14 accommodates adjacent to the closure element 16 a piston 18 in a sealingly and axially movable manner, which can be actuated through the latter. A central valve 20 with a valve seat 22 and an axially movable valve body 24 which is resiliently biased towards the valve seat 22 is arranged in the piston 18. In the illustrated open condition the central valve 20 releases a fluid connection via a replenishing bore 26 between a not shown fluid reservoir which is connected with the replenishing bore 26 and a pressure chamber 28, which is defined in the bore 14 between the piston 18 and the not shown closed one end of the bore 14. In the figure the piston 18 is shown in its rest or initial position which it assumes in the non-actuated condition and into which it is biased in the usual manner by a return spring 30. The not shown parts of the master cylinder 10 are of the usual known construction so that a detailed description can be dispensed with. In addition to the illustrated piston 18 a similarly constructed second piston can be arranged in the not shown part of the master cylinder 10, which will then be referred to as the secondary piston.

The valve body 24 of the central valve 20 has a pin-shaped extension 32 which extends through the piston 18, at whose free end a transverse pin 34 is attached which serves as an abutment member. The transverse pin 34 is clearance-fitted in a radial passage 36 of an actuation extension 38 with reduced diameter, which is integrally connected with the piston 18, which extends through the closure element 16, protrudes from the housing 12 of the master cylinder 10 and which is intended for connection with a not shown bar-shaped input member. When the piston 18 assumes the shown rest position, the transverse pin 34 abuts an annular stop disk 40 which in turn contacts the end face of an elastomeric part 42 associated with the closure element 16 so that the central valve 20 is held in the open position.

In addition to the annularly formed elastomeric part 42 the closure element 16 comprises an axially following separate and also annularly shaped part 44 made from a rigid material, for example, from a suitable hard synthetic material. On its end face facing towards the elastomeric part 42, the part 44 made from a rigid material comprises an annular circumferential projection 46 which extends in the axial direction, which in the shown example tapers conically towards its free end and whose free end is formed by a number of pin-shaped extensions 48 which are equally spaced from each other in the circumferential direction and which also extend in an axial direction. As can be seen from the figure, the axial extension of the projection 46 (including its extensions 48) is selected in such a manner that the elastomeric part 42 is nearly completely penetrated in the axial direction by the projection 46. Between the end face of the elastomeric part 42 which is in contact with the annular stop disk 40 and the end face of each of the pin-shaped extensions 48, there is only the free space identified by L. The maximum cross-sectional dimension of the projection 46, which in the shown embodiment is located at the base of the projection 46 due to the conical configuration of same, amounts to less than half of the cross-sectional dimension S of the elastomeric part 42.

The parts 42 and 44 of the closure element 16 which, due to their separate configuration, lend themselves to an economic manufacture are detachably connected with each other by joining. The closure element 16 whose part 44 in the shown example comprises an integrally formed hollow cylindrical extension 50 for an improved guidance of the actuation extension 38 is secured in the step-shaped expanded end section of the bore 14 of the master cylinder 10 by means of a circlip 52 arranged in a circumferential groove.

The function of the illustrated master cylinder 10 is as follows: On the basis of the shown initial position of all parts the piston 18 is moved to the left relative to the housing 12 of the master cylinder 10 with reference to the figure upon an actuation of the braking system by the driver via the not shown bar-shaped input member which is connected with the actuation extension 38 of the piston 18. Thereby the transverse pin 34 which, in the non-actuated condition of the master cylinder, keeps the central valve 20 open, clears the annular stop disk 40, and the central valve 20 which is resiliently biased in the closing direction closes, whereupon corresponding to the continued axial movement of the piston 18 fluid pressure is built up in the pressure chamber 28. During such an actuation of the master cylinder 10 the closure element 16 provides for both the sealing of the bore 14 against the actuation extension 38 and for its guidance.

The relief movement upon the release of the brake correspondingly takes place in the reverse order, i.e. the piston 18 moves to the right with reference to the figure under the action of the return spring 30, and the transverse pin 34 abuts the annular stop disk 40 immediately before the rest position of the piston 18 is reached so that the central valve 20 opens again and any prevailing low residual pressure in the pressure chamber 28 is drained via the replenishing bore 26 into the not shown fluid reservoir.

The following shall be based on the assumption that shortly before a brake actuation by the driver an antislip control cycle has been executed within which an additional fluid volume was automatically supplied from the fluid reservoir to the pressure chamber 28 in order to provide brake pressure for the reduction of the wheel slip. If the driver initiates a brake actuation immediately following such an antislip control cycle, the central valve 20 must be opened at the end of the braking operation against what may be a considerable overpressure because a pressure relief in the pressure chamber 28 by means of returning the additionally fluid volume supplied during the antislip control cycle into the fluid reservoir was no longer possible before the immediately succeeding brake actuation initiated by the driver. Depending on how large the fluid volume was which was supplied during the antislip control cycle, a more or less high overpressure will be prevailing in the pressure chamber 28 even when the piston 18 has returned into its initial position after the completion of the brake actuation initiated by the driver. In such a case, too, however, the opening time of the central valve 20 varies only negligibly because the pressure transferred from the pressure chamber 28 via the transverse pin 34 and the annular stop disk 40 onto the end face of the elastomeric part effects a rapid compression of the elastomeric part 42 under elimination of the free spaces L so that the annular stop disk 40 abuts the head faces of the pin-shaped extensions 48 of the projection 46 formed at the part 44 almost without delay. The rigid material of the part 44 permits no further axial displacement of the annular stop disk 40 and thus of the transverse pin 34 so that the central valve 20 opens reliably also against a high overpressure and maintaining an accurately defined opening point with respect to the position of the piston 18.

What is claimed is:

1. A master cylinder for a hydraulic vehicle braking system including a housing having a bore formed therein and extending along a longitudinal axis, whose one end is closed by an end wall associated with the housing of the master cylinder and whose other opposite end is sealingly closed by a closure element, with a piston being accommodated sealingly and axially movable in the bore adjacent to the closure element, which can be actuated through same, which has a central valve enabling a fluid connection between a fluid reservoir and a pressure chamber which is defined in the bore by the end wall and the piston and which, when the piston is not actuated, is held in the open position by means of an abutment member acting on the closure element, wherein the closure element is formed from separate first and second parts axially succeeding one another, wherein the first part faces towards the bore and is made from an elastomeric material, and wherein the second part faces away from the bore and is made from a rigid material, characterized in that the first and second parts of the closure element are detachably connected with each other and an annular circumferential projection, which is integrally formed with the second part whose maximum cross-sectional dimension amounts to not more than approximately half of the cross-sectional dimension of the first part, and penetrates the first part completely or nearly completely in an axial direction.

2. The master cylinder according to claim 1, characterized in that the cross-sectional dimension of the projection decreases towards a free end thereof.

3. The master cylinder according to claim 2, characterized in that the reduction of the cross-sectional dimension of the projection is effected in a step-wise manner.

4. The master cylinder according to claim 2, characterized in that the reduction of the cross-sectional dimension of the projection is effected in a continuous manner.

5. The master cylinder according to claim 1, characterized in that the projection has a free end which is formed by a number of pin-shaped extensions which are equally spaced from each other in the circumferential direction extending in an axial direction.

6. The master cylinder according to claim 1, characterized in that the second part comprises a hollow cylindrical extension at a face end thereof facing away from the first part.

* * * * *